July 29, 1930.  C. L. HEISLER  1,771,922
FILM DRIVING
Filed July 5, 1927
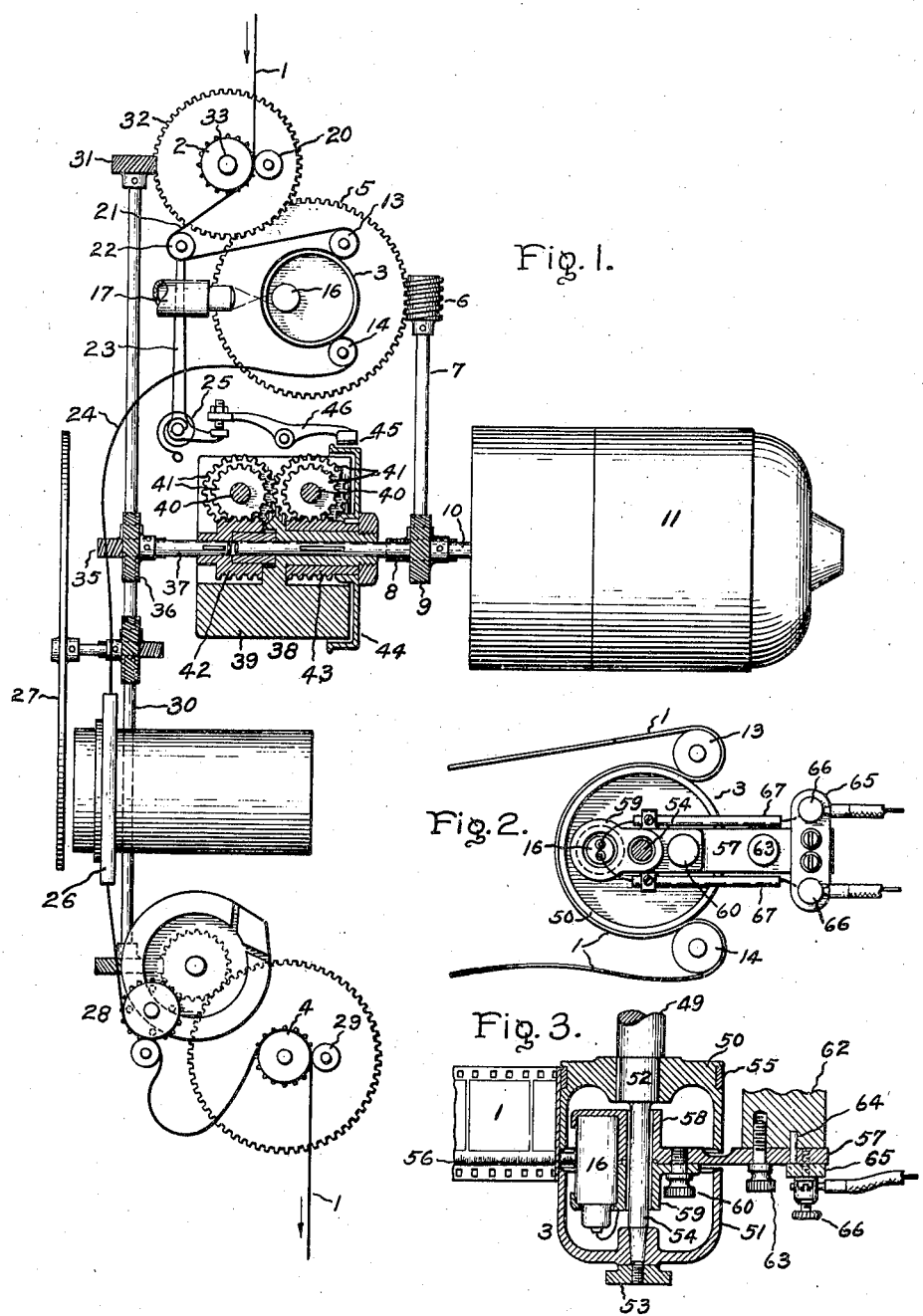
Inventor
Charles L. Heisler,
by [signature]
His Attorney.

Patented July 29, 1930

1,771,922

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

FILM DRIVING

Application filed July 5, 1927. Serial No. 203,344.

My invention relates to the recording of sound on a film and the reproduction of the sound from a film record. A convenient manner of making a sound film record is to expose a moving light-sensitive film, such for example as a motion picture film, to a light beam which is caused to vary in intensity or position in accordance with the sound waves to be recorded. For moving the film it is usual to provide the film with a row of sprocket tooth openings along each edge which openings are engaged by the teeth on suitable sprocket wheels over which the film is lead in passing from one reel to the other as in motion picture apparatus. For moving the film where it is exposed to the variable light beam in the recording process and for moving the film bearing the sound record when it is passed through a constant light beam in the reproducing process I have found it desirable to employ a belt-type drive rather than a sprocket drive, and for this purpose I use a smooth faced wheel or drum rather than a sprocket wheel and rotate it at a substantially uniform speed. I have found it to be very difficult however to construct the wheel or drum having a diameter of such exactness that when both drum and sprocket wheels are connected to be driven from a common driving member, the film will be moved by the wheel or drum at exactly the same linear speed as it is moved by the sprocket wheels. Invariably the loop of film formed between the drum and a sprocket wheel will gradually increase or gradually decrease as the film is passed from one reel to the other. If conditions are such that the loop continues to decrease until it disappears and the film is drawn tight, a certain amount of slipping of the film over the drum is bound to occur. On the contrary, if the loop continues to increase, it is liable to become tangled up in the apparatus and be broken. The evil results of such increase and decrease in the size of the loop are still worse in the case of a combined motion picture and sound record film where proper synchronism between the pictures and the reproduced sounds depends upon the uniformity of the distance measured along the film between the sound reproducer and the picture projector.

Shrinkage of the film due to developing and age also seriously affect the relative rates at which it is passed by the sprockets and the drum. It will readily be seen that a shrunken film will be moved by the sprockets at a slower linear speed than one which has not shrunk, hence there is a tendency for the loop between the drum and a sprocket at one side of the drum to steadily decrease until it is drawn tight and is forced to slip over the drum and for the loop between the drum and a sprocket on the other side of the drum to steadily increase.

One object of my invention is to provide an improved method of and means for moving a sound record film by means of both sprocket and belt-type drives whereby the above mentioned difficulties may be avoided. Another object of my invention is to provide an improved means for supporting and moving the film at the point where the sound is recorded thereon or reproduced therefrom.

In accordance with my invention I operate the belt-type drive engaging the film at a substantially constant speed and operate the driving sprocket or sprockets engaging the film at approximately the same speed but vary the speed of the sprocket or sprockets in such a manner that the film is moved at the same rate by both the belt-type and the sprocket drives. For the purpose of illustration, I have chosen to show my invention as comprising a portion of a sound producing motion picture apparatus, the sound and picture records being borne by the same film. It will be understood however that it is not limited to such but is applicable also to the apparatus for recording the pictures and sound and for recording the sound alone.

My invention will be better understood from the following description taken in connection with the accompanying drawing, and its scope will be pointed out in the appended claims.

Referring to the drawing, Fig. 1 shows a portion of a picture projecting and sound reproducing apparatus involving my invention; and Figs. 2 and 3 are details of the same drawn to a larger scale.

In the drawing the film 1 passes over and is adapted to be moved uniformly by the sprocket wheel 2, the smooth faced wheel or drum 3 constituting a belt-type drive for the film and the sprocket wheel 4, suitable reels (not shown) being provided from which and to which the film is wound as is common in motion picture machines. The reel from which the film is being unwound may be provided with a suitable brake and the reel upon which the film is being wound may be provided with a take-up device which for example may have a friction drive operated by a connection with the driving motor. As this portion of the apparatus forms no part of my invention and is commonly employed in motion picture apparatus I have omitted any illustration thereof. The member 3 which hereafter will be termed simply a drum is mounted on the same shaft as the driving gear 5 which is shown as a worm gear meshing with the worm 6 on the counter shaft 7. This shaft is rotated by gear connection, shown as spiral gears 8 and 9, with the main drive shaft 10 operated by the motor 11. For reasons which will appear hereinafter I have shown the drum 3 of relatively large size and by means of the idlers 13 and 14 which preferably have resilient tires and press the film against the face of the drum have shown the film engaging the drum for about two thirds of the periphery. Since the apparatus which I have chosen to illustrate is for reproducing purposes, I have shown the photo-electric cell 16 mounted within the drum, the construction of which will be described subsequently. Light rays from a suitable source not shown, are directed through the tube 17 onto the portion of the film bearing the sound record from which they pass to the photo-electric cell. Various means may be employed for limiting the light rays which engage the film to a narrow band, such a screen having a narrow aperture placed close in front of the film or as I have illustrated on the drawing an optical system may be used which focuses the beam down to the desired width at the film. Instead of a rotatable drum to support and drive the film where it is subjected to the light beam, I may use a fixed support or skid and draw the film thereover by means of a belt-type drive comprising simply a single roller around which the film passes or a pair of cooperating rollers between which the film passes one or both of which may be connected to be driven from the shaft 7. I use the term belt-type drive therefor to distinguish over a sprocket drive and by it refer to any arrangement comprising one or more rollers or wheels which have a relatively smooth face for engaging the film. It may be mentioned at this point that while a sprocket drive may be used satisfactorily to carry the main load in moving the film, I have found it very unsatisfactory for moving the film at the point at which it is subjected to the light in either the recording or in the reproducing process, for the successive engagement of the sprocket teeth with the film sets up vibrations which are distinctly heard when the recorded sound is reproduced.

In my apparatus the film 1 is drawn from the unwinding reel by the sprocket 2 against which it is held by the idler 20, thence passes in a loop 21 around idler 22 mounted on the bell crank lever 23, over idler 13, drum 3, idler 14 to loop 24. Loop 21 is kept taut by the spring 25 tending to rotate the bell crank lever 23 counterclockwise. From loop 24 I have shown the film passing down to a motion picture projector having the film guide 26, the shutter 27, and the intermittent motion mechanism 28, the film finally passing through another loop to the sprocket 4 against which it is held by the idler 29. The mechanisms of the picture projector and the sound reproducer are connected to be driven from the same shaft 30, the upper end of this shaft being provided with the gear 31 which meshes with the gear 32 mounted on the same shaft 33 as the sprocket 2, and the lower portion being provided with suitable gears for operating the intermittent motion mechanism 28 and the sprocket 4 of the projector. Shaft 30 has the gear 35 meshing with the gear 36 on the shaft 37. The latter shaft is driven by the motor shaft 10 through the variable speed mechanism 38 controlled by the position of the bell crank lever 23. Various well known mechanisms may be used for this purpose and they may be of simple and inexpensive types for inasmuch as the film is arranged to be driven steadily where it is engaged by the light beam it is immaterial if the rest of the apparatus is subjected to relatively sudden changes in speed. For instance, an extremely slight changes in speed of the film produces a noticeable change in pitch of the reproduced sound but a speed change many times greater will not be noticed in the projection of the pictures. At 38 I have shown a simple differential speed mechanism which I have devised for this purpose comprising the frame 39 keyed to the motor shaft 10 and having the two gear shafts 40 on each of which are secured two spiral gears 41. The larger of these gears mesh with ich other, the smaller mesh respectively with the gear 42 keyed to shaft 37 and with the gear 43 to which is keyed the brake drum 44. Brake 45 on lever 46 is moved to engage the drum 44 by the counterclockwise movement of the bell crank lever 23. The gears just described are so arranged that when the brake drum 44 is unrestrained the driven shaft 37 runs at the same speed as the motor shaft 10 but when the brake is applied to the drum the driven shaft runs slower than the motor shaft. In the construction of the mechanism as a whole I prefer to have the sprockets 2 and 4 move the film at a slightly greater speed than it is moved by the belt-type drive comprising the drum 3. The film loop 21 will thereby steadily increase in size allowing the bell crank lever 23 to rock and apply the brake to the brake drum 44. The resultant decrease in speed of the sprockets causes a shortening of the loop 21 and a release of the brake, the process being repeated with more or less regularity during the operating of the mechanism.

When the apparatus is used to make a sound record on the film the photo-electric cell is not used and the light beam instead of being steady is caused to undergo variation in accordance with the sound waves to be recorded. These variations may comprise variations in intensity of a fixed beam, variation in position of a beam of constant intensity of variations of some other character depending upon the type of record being made.

In Figs. 2 and 3 I have shown a form of drum which I have devised particularly for reproducing purposes. The drum 3 is mounted on the free end of the rotatable shaft 49 and comprises two spaced complementary portions 50 and 51, the former or inner portion being keyed to a slightly reduced portion 52 of the shaft and the latter or outer portion being detachably secured by the thumb screw 53 to the tapered end of the reduced extension 54 of the shaft. I have shown drum portion 50 provided with an inset tire 55 which is made of a material, preferably rubber, that will cling to and prevent slipping of the film on the drum. The peripheral face of the tire should be but very slightly higher than the face of the drum and for the best results should not extend close to that portion of the film bearing the sound record. That portion of the film needs the firm support provided by the face of the drum since the record portion of the film must be kept in the exact focus of the light beam when an optical system is used as shown in Fig. 1 or kept at a small fixed distance from a screen having a light aperture therein of the desired width when such an arrangement is used. The rubber-faced idlers 13 and 14 engage the film opposite the rubber tire 55 and if desired may also engage it opposite the drum portion 51. The two drum portions are spaced apart an amount approximately equal to the sound record band 56, a small clearance preferably being left however at each side of the record band. The film thereby has firm support immediately adjacent each side of the sound record, yet without interfering with the passage of light to the cell under the control of the record. The film is maintained in proper axial alinement on the drum by suitable means, as for example flanges (not shown) on the idler 22.

The photo-electric cell 16 is supported by the bracket 57, the end portion 58 of which is suitably shaped to recive one end of the cell. The detachable member 59 is secured to the bracket by the thumb screw 60 and engages the other end of the cell. The bracket and attached member are both provided with an opening through which extends the reduced shaft extension 54, suitable clearance being provided to avoid rubbing of the parts. If desired, the bracket may be journaled on the shaft. Where the bracket extends through the space between the two drum sections it is shown having a reduced section. I have shown the bracket 57 removably secured to a fixed support 62 by means of the thumb screw 63 and the dowel pin 64. The bracket also has attached to it the insulating strip 65 supporting the binding posts 66 which connect by wires run through the tubes 67 to the photo-electric cell.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. The method of moving the same total length of film in a sound recording or sound reproducing apparatus having a sprocket drive and a belt-type drive for the film and a common driving member connected with said drives, which comprises operating the driving member at substantially constant speed and varying the connection between the driving member and the sprocket drive in accordance with the speed at which the film is moved by the belt-type drive.

2. The method of moving the film in a sound recording or in a sound reproducing apparatus having a sprocket drive and a belt-type drive in successive engagement with the film and connected with a common driving member which comprises operating the driving member at a substantially constant speed and varying the connection between the driving member and the sprocket drive in accordance with the length of film between the two drives.

3. In apparatus for recording sound on or in apparatus for reproducing sound from a moving film having sprocket tooth openings therein, a sprocket drive and a belt-type drive adapted simultaneously to engage said film, means for operating said drives from a common member, and means for varying the speed of said sprocket drive relative to that of said member, whereby the same total length of film is moved by both of said drives.

4. In apparatus for recording sound on or in apparatus for reproducing sound from a moving film having tooth openings therein, a plurality of drives for said film comprising a toothed wheel and a smooth-faced wheel, a common operating means having a connection with each of said drives, and means arranged in the connection with said toothed wheel for automatically regulating the speed thereof to cause said drives to pass equal total lengths of said film.

5. In sound recording or reproducing apparatus employing a film having sprocket tooth openings therein, film driving means comprising a sprocket wheel and a drum adapted successively to engage said film, means comprising a single motor for operating said driving means, and means responsive to the length of film between said sprocket wheel and said drum for varying the speed of the sprocket wheel.

6. In sound recording or reproducing apparatus having a film provided with sprocket tooth openings therein, a sprocket drive for the film, a drum over which the film passes, said film forming a loop between the sprocket and the drum, a motor having driving connections with said sprocket and said drum, and means responsive to the size of said loop for controlling the speed of said sprocket.

7. In a combined motion picture projecting and sound reproducing apparatus through which a film bearing picture and sound records is adapted to be passed, a sprocket adapted to engage and drive the film in the picture projecting portion of the apparatus, a drum adapted to engage and drive the film in the sound reproducing portion of the apparatus, a motor for rotating said sprocket and said drum, and means for automatically regulating the speed of said sprocket in accordance with the length of film between the sprocket and the drum.

8. In sound recording or reproducing apparatus employing a film having sprocket tooth openings therein, film driving means comprising a sprocket and a drum adapted successively to engage said film, a single driving motor having a non-slippable connection with the drum and a variable speed connection with the sprocket, and means responsive to the length of film between the sprocket and the drum for controlling said variable speed connection.

In witness whereof, I have hereunto set my hand this 1st day of July, 1927.

CHARLES L. HEISLER.